United States Patent
Chen (10) Patent No.: US 11,503,485 B2
(45) Date of Patent: Nov. 15, 2022

(54) METHOD, SYSTEM AND DEVICE FOR CIRCUMVENTING FAR-END INTERFERENCE

(71) Applicant: DATANG MOBILE COMMUNICATIONS EQUIPMENT CO.,LTD., Beijing (CN)

(72) Inventor: Xianguo Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/417,742

(22) PCT Filed: Aug. 19, 2019

(86) PCT No.: PCT/CN2019/101407
§ 371 (c)(1),
(2) Date: Jun. 23, 2021

(87) PCT Pub. No.: WO2020/134122
PCT Pub. Date: Jul. 2, 2020

(65) Prior Publication Data
US 2022/0046440 A1      Feb. 10, 2022

(30) Foreign Application Priority Data
Dec. 27, 2018   (CN) .......................... 201811611120.X (51) Int. Cl.
*G06F 11/00* (2006.01)
*H04W 24/04* (2009.01)

(52) U.S. Cl.
CPC .................... *H04W 24/04* (2013.01)

(58) Field of Classification Search
CPC ................................................... H04W 24/04
(Continued)

(56) References Cited

U.S. PATENT DOCUMENTS

2016/0044689 A1   2/2016  Wen et al.
2016/0285654 A1*  9/2016  Gävert ................. H04B 17/354
(Continued)

FOREIGN PATENT DOCUMENTS

CN      101132200 A     2/2008
CN      102595471 A     7/2012
(Continued)

OTHER PUBLICATIONS

3GPP TR 38.866 V16.0.0,3rd Generation Partnership Project;Technical Specification Group Radio Access Network; Study on remote interference management for NR (Release 16) total 31 pages, Dec. 2018.
(Continued)

*Primary Examiner* — Chuong T Ho
(74) *Attorney, Agent, or Firm* — Kilpatrick Townsend & Stockton, LLP (57) ABSTRACT

Disclosed in the present application are a method, system and device for circumventing far-end interference, which are used to better circumvent far-end interference by means of flexibly adjusting a GP length. The method for circumventing far-end interference provided by the present application includes an interference-receiving station preliminarily determining that there is far-end interference according to far-end interference features, and sending a first dedicated reference signal sequence to an interfering station; the interfering station determining that there is far-end interference according to the first dedicated reference signal sequence, and sending a second dedicated reference signal sequence to the interference-receiving station; the interference-receiving station finally determining that there is far-end interference according to the second dedicated reference signal sequence; and the interference-receiving station and
(Continued)

the interfering station circumventing the far-end interference by means of adjusting the GP length.

13 Claims, 4 Drawing Sheets

(58) Field of Classification Search
USPC .......................................... 370/252, 253, 254
See application file for complete search history.

(56) References Cited

U.S. PATENT DOCUMENTS

| | | | |
|---|---|---|---|
| 2017/0201899 A1* | 7/2017 | Guan | H04W 24/00 |
| 2018/0249472 A1* | 8/2018 | Liu | H04L 25/0328 |
| 2018/0270680 A1* | 9/2018 | Van Doorselaer | H04L 43/16 |
| 2018/0279334 A1* | 9/2018 | Lim | H04L 5/0091 |
| 2018/0343103 A1 | 11/2018 | Park et al. | |
| 2021/0185726 A1* | 6/2021 | Xu | H04W 88/14 |
| 2022/0085941 A1* | 3/2022 | Chen | H04L 5/0092 |

FOREIGN PATENT DOCUMENTS

| | | |
|---|---|---|
| CN | 102655650 A | 9/2012 |
| CN | 105828349 A | 8/2016 |
| CN | 106792793 A | 5/2017 |
| CN | 108259112 A | 7/2018 |
| CN | 108882303 A | 11/2018 |
| CN | 109040947 A | 12/2018 |
| WO | 2018143752 A | 8/2018 |

OTHER PUBLICATIONS

YAOKe-yu,"Research on Atmospheric Duct Distal Interference Solution for TD-LTE", China Academic Journal Electronic Publishing House; vol. 16, 2016, pp. 36-41.
CATT,"Views on remote interference management", 3GPP TSG RAN WG1 Meeting #94, Gothenburg, Sweden, Aug. 20-24, 2018, total 5 pages, R1-1808408.
NTT Docomo, Inc.,"Views on remote interference management for NR", 3GPP TSG RAN WG1 Meeting #94, Gothenburg, Sweden, Aug. 20-24, 2018, total 6 pages, R1-1809162.
CMCC,"Draft summary on Study on NR-RIM",3GPP TSG RAN WGI Meeting #94, Aug. 20-24, 2018, Gothenburg, Sweden, total 30 pages, R1-1809973.
ZTE,"Discussion on RIM mechanisms for improving network robustness",3GPP TSG RAN WG1 Meeting #95, Spokane, USA, Nov. 12-16, 2018, total 13 pages, R1-1812440.
CMCC,"Text proposal for TR 38.866 Study on remote interference management for NR", 3GPP TSG RAN WG1 Meeting #95, Spokane, USA, Nov. 12-16, 2018, total 24 pages, R1-1814360.

* cited by examiner

METHOD, SYSTEM AND DEVICE FOR CIRCUMVENTING FAR-END INTERFERENCE

BACKGROUND

The present application is a National Stage of International Application No. PCT/CN2019/101407, filed on Aug. 19, 2019, which claims the priority from Chinese Patent Application No. 201811611120.X, filed with the Chinese Patent Office on Dec. 27, 2018 and entitled "Method, System and Device for Circumventing Far-End Interference", both of which are hereby incorporated by reference in their entireties.

FIELD OF DISCLOSURE

The present application relates to the field of communication technologies, and particularly to a method, system and device for circumventing far-end interference.

Under some meteorological conditions, there is a layer where the temperature inversion or the water vapor decreases sharply with height in the atmospheric troposphere. In this layer, the radio waves form the super-refraction propagation, the propagation loss is very small, and the ultra-long distance propagation can be achieved. Most of the radio wave radiation is limited in this layer, and similar to the propagation in a waveguide, this phenomenon is called the atmospheric waveguide propagation of electromagnetic waves. When the atmospheric waveguide occurs in a Time Division Duplexing (TDD) wireless network, the downlink signal of a far-end base station still has the high strength after being transmitted over an ultra-long distance of tens or hundreds of kilometers, and the signal propagation delay exceeds the Guard Period (GP) length of uplink time slots and falls within an uplink sub-frame of a near-end base station, causing the serious uplink interference. Such interference is called far-end interference or atmospheric waveguide interference.

The far-end interference is widespread in the TDD wireless network and has a very bad impact on the performance of the existing network. The existing interference circumvention scheme based on feature sequence detection can only circumvent the far-end interference within 200 km, and the interference detection and interference circumvention are not real-time.

BRIEF SUMMARY

The embodiments of the present application provide a method, system and device for circumventing far-end interference, and to better circumvent the far-end interference by adjusting the length of the GP flexibly.

A method for circumventing far-end interference provided by an embodiment of the present application includes:

determining, by an interfered station, that there is far-end interference preliminarily according to far-end interference features, and sending a first dedicated reference signal sequence to an interfering station;

and the far-end interference features include a ramp feature of time-domain interference intensity from high to low;

determining, by the interfering station, that there is far-end interference according to the first dedicated reference signal sequence, and sending a second dedicated reference signal sequence to the interfered station;

determining, by the interfered station, that there is far-end interference finally according to the second dedicated reference signal sequence;

based on the reciprocity of the far-end interference, the interfered station and the interfering station circumvent the far-end interference by adjusting the GP length;

the reciprocity of the far-end interference refers to the two-way degree of the far-end interference of the opposite end that can be mutually received between the base stations in a period of time, and is quantitatively evaluated by the reciprocity law of the far-end interference.

In one embodiment, the interfered station and/or the interfering station adjust the GP length in a following way:

adjusting the GP length by adjusting a time slot format configuration according to distance information of a detected far-end interference source when a reference signal sequence is continuously detected within first preset time; and the distance information of the far-end interference source is determined according to a detection result of the far-end interference source within the first preset time.

Here, the detection result information of the far-end interference includes but is not limited to a base station ID of the far-end interference source, the distance of the far-end interference source, the strength of the far-end interference source and other information.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfered station or the interfering station adjusts the GP length by adjusting the time slot format configuration according to the distance information of the detected far-end interference source, if the reference signal sequence is not continuously detected within second preset time, the GP length of the interfered station or the interfering station is restored. In one embodiment, the interfered station and/or the interfering station adjust the GP length in a following way:

reporting the detection result information of the far-end interference to a centralized control device or an OAM; and the centralized control device or the OAM determines a base station which needs to adjust the GP length according to the detection result information of the far-end interference and instructs the base station to adjust the GP length by adjusting a time slot format configuration.

For the adjustment of the GP length, in the 5G NR, the base station adjusts the GP length by adjusting the time slot format configuration, and the time slot format must be the time slot format specified by the 3GPP protocol. According to the protocol agreement, the GP length is the number of "F" symbols (i.e., Flexible symbols which are symbols that are not designated for uplink time slots or downlink time slots and can be used for uplink time slots, downlink time slots or GP as required) in the time slot format, and the GP length needs to meet the distance requirement of the far-end interference source obtained by detection and statistics, that is, the wireless propagation distance corresponding to the time delay converted from the number of GP symbols must not be less than the distance of the far-end interference source in the far-end circumvention method provided by the present application. For example, if all 14 symbols of a special time slot (S time slot) are rolled back and used as the GP but cannot meet the distance requirement of the detected far-end interference source, 14 symbols of a next downlink time slot (D time slot) immediately before the S time slot are partially or completely rolled back, and no data is sent on the rolled-back symbols.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfered station or the interfering station adjusts the GP length by adjusting the time slot format configuration according to indication information of the centralized control device or the OAM, if the reference signal sequence is not continuously detected within second preset time, the detection result information of the far-end interference is reported to the centralized control device or the OAM; and the centralized control device or the OAM instructs the interfered station or the interfering station to adjust the GP length by adjusting the time slot format configuration according to the detection result information of the far-end interference.

The method for circumventing far-end interference provided by the present application can adjust the GP length flexibly and dynamically according to the distance information of the detected far-end interference source, and to sufficiently reduce the loss of the downlink throughput caused by the rolled-back symbols due to interference circumvention; and the present application does not require the identification of far-end interference sources, and the interference circumvention will be performed as long as the far-end interference is continuously detected. Therefore, the interference detection and interference circumvention of the far-end interference provided by the present application has the better timeliness.

An embodiment of the present application provides a method for circumventing far-end interference at the interfered station side, where the method includes:

determining, by an interfered station, that there is far-end interference preliminarily according to far-end interference features, and sending a first dedicated reference sequence to an interfering station;

receiving, by the interfered station, a second dedicated reference signal sequence sent by the interfering station;

determining, by the interfered station, that there is far-end interference finally according to the second dedicated reference signal sequence;

circumventing, by the interfered station, the far-end interference by adjusting a GP length.

Correspondingly, an embodiment of the present application provides a method for circumventing far-end interference at the interfering station side, where the method includes:

receiving, by an interfering station, a first dedicated reference signal sequence sent by an interfered station;

determining, by the interfering station, that there is far-end interference according to the first dedicated reference signal sequence, and sending a second dedicated reference signal sequence to the interfered station;

circumventing, by the interfering station, the far-end interference by adjusting a GP length.

According to the above methods, an embodiment of the present application provides a system for circumventing far-end interference, including: an interfered station and an interfering station, and the interfered station determines that there is far-end interference preliminarily according to far-end interference features and sends a first dedicated reference signal sequence to the interfering station;

the interfering station determines that there is far-end interference according to the first dedicated reference signal sequence, and sends a second dedicated reference signal sequence to the interfered station;

the interfered station determines that there is far-end interference finally according to the second dedicated reference signal sequence;

the interfered station and the interfering station circumvent the far-end interference by adjusting the GP length.

In one embodiment, the interfered station and/or the interfering station adjust the GP length in a following way:

adjusting the GP length by adjusting a time slot format configuration according to distance information of a detected far-end interference source when a reference signal sequence is continuously detected within first preset time; and the distance information of the far-end interference source is determined according to a detection result of the far-end interference source within the first preset time.

Here, the detection result information of the far-end interference includes but is not limited to a base station ID of the far-end interference source, the distance of the far-end interference source, the strength of the far-end interference source and other information.

In one embodiment, the interfered station and/or the interfering station adjust the GP length in a following way:

reporting the detection result information of the far-end interference to a centralized control device or an OAM; and the centralized control device or the OAM determines a base station which needs to adjust the GP length according to the detection result information of the far-end interference and instructs the base station to adjust the GP length by adjusting a time slot format configuration.

At the interfered station side, an embodiment of the present application provides a device for circumventing far-end interference, which includes:

a sending device used by an interfered station to determine that there is far-end interference preliminarily according to far-end interference features, and send a first dedicated reference sequence to an interfering station;

a receiving device used by the interfered station to receive a second dedicated reference signal sequence sent by the interfering station;

a determining device used by the interfered station to determine that there is far-end interference finally according to the second dedicated reference signal sequence;

a circumvention device used by the interfered station to circumvent the far-end interference by adjusting a GP length.

In one embodiment, the interfered station adjusts the GP length in a following way:

adjusting the GP length by adjusting a time slot format configuration according to distance information of a detected far-end interference source when a reference signal sequence is continuously detected within first preset time; and the distance information of the far-end interference source is determined according to a detection result of the far-end interference source within the first preset time.

The detection result information of the far-end interference includes but is not limited to a base station ID of the far-end interference source, the distance of the far-end interference source, the strength of the far-end interference source and other information.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfered station adjusts the GP length by adjusting the time slot format configuration according to the distance information of the detected far-end interference source, if the reference signal sequence is not continuously detected within the second preset time, the GP length of the interfered station is restored.

In one embodiment, the interfered station adjusts the GP length in a following way:

reporting the detection result information of the far-end interference to a centralized control device or an OAM; and the centralized control device or the OAM determines a base station which needs to adjust the GP length according to the detection result information of the far-end interference and instructs the base station to adjust the GP length by adjusting a time slot format configuration.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfered station adjusts the GP length by adjusting the time slot format configuration according to the detected indication information of the centralized control device or the OAM, if the reference signal sequence is not continuously detected within the second preset time, the detection result information of the far-end interference is reported to the centralized control device or the OAM; and the centralized control device or the OAM instructs the interfered station to adjust the GP length by adjusting the time slot format configuration according to the detection result information of the far-end interference.

At the interfering station side, an embodiment of the present application provides a device for circumventing far-end interference, which includes:

a receiving device used by an interfering station to receive a first dedicated reference signal sequence sent by an interfered station;

a sending device used by the interfering station to determine that there is far-end interference according to the first dedicated reference signal sequence, and send a second dedicated reference signal sequence to the interfered station;

a circumvention device used by the interfering station to circumvent the far-end interference by adjusting a GP length.

In one embodiment, the interfering station adjusts the GP length in a following way:

adjusting the GP length by adjusting a time slot format configuration according to distance information of a detected far-end interference source when a reference signal sequence is continuously detected within first preset time; and the distance information of the far-end interference source is determined according to a detection result of the far-end interference source within the first preset time.

Here, the detection result information of the far-end interference includes but is not limited to a base station ID of the far-end interference source, the distance of the far-end interference source, the strength of the far-end interference source and other information.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfering station adjusts the GP length by adjusting the time slot format configuration according to the distance information of the detected far-end interference source, if the reference signal sequence is not continuously detected within the second preset time, the GP length of the interfering station is restored.

In one embodiment, the interfering station adjusts the GP length in a following way:

reporting the detection result information of the far-end interference to a centralized control device or an OAM; and the centralized control device or the OAM determines a base station which needs to adjust the GP length according to the detection result information of the far-end interference and instructs the base station to adjust the GP length by adjusting a time slot format configuration.

In one embodiment, the distance information of the far-end interference source is determined according to one of:

statistical distribution information of distances of all far-end interference sources detected in a detection window;

a last symbol of the reference signal sequence detected in the detection window.

In one embodiment, after the interfering station adjusts the GP length by adjusting the time slot format configuration according to the detected indication information of the centralized control device or the OAM, if the reference signal sequence is not continuously detected within the second preset time, the detection result information of the far-end interference is reported to the centralized control device or the OAM; and the centralized control device or the OAM instructs the interfering station to adjust the GP length by adjusting the time slot format configuration according to the detection result information of the far-end interference.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

In order to make the embodiments of the present application clearer, the embodiments of the present application will be described clearly and completely below in combination with the accompanying drawings in the embodiments of the present application. The described embodiments are a part of the embodiments of the present application but not all the embodiments.

The embodiments of the present application will be described clearly and completely below in combination with the accompanying drawings in the embodiments of the present application. The described embodiments are only a part of the embodiments of the present application but not all the embodiments.

Some embodiments of the present application provide a method and device for circumventing far-end interference, and to circumvent the far-end interference at all possible distances as much as possible by adjusting the length of the GP flexibly.

Here, the method and apparatus are based on the same application concept. Since the principle of solving the problem in the method is similar to that in the apparatus, the implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in embodiments of the present application may be a base station, which may include cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, and the rest of the access network may include IP networks. The network device can further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

Embodiments of the present application will be described below in detail with reference to the drawings of the specification. It should be noted that the showing order of the embodiments of the present application only represents the sequential order of the embodiments.

The far-end interference is widespread in the TDD wireless network, and once it occurs, it will have a great impact on the performance of the existing network. The existing interference circumvention scheme based on feature sequence detection can only circumvent the far-end interference within 200 km, and the interference detection and interference circumvention are not real-time.

The prior art mainly has the following problems:

After detecting the feature sequences continuously, the base station automatically switches the special subframe ratio from 9:3:2 or 10:2:2 to 3:9:2 to implement the interference circumvention, but it can only circumvent the far-end interference within 200 km. However, there is a lot of far-end interference greater than 200 km in the existing networks;

Only the fixed rollback to 3:9:2 can be used to circumvent the far-end interference, and the GP length cannot be adjusted flexibly and dynamically according to the distance information of the detected far-end interference source to sufficiently reduce the loss of the downlink throughput caused by the rolled-back symbols due to interference circumvention, while the distance distribution of the far-end interference source will vary greatly with the change in region, scene and time period;

Since the base station needs to detect and identify all far-end interference sources, the detection cycle is too long, and it is unable to detect in real time, which affects the timeliness of interference circumvention;

Since the feature sequence occupies the full bandwidth, the base station must detect the feature sequence within the full bandwidth. This requires that the central frequency points and bandwidths of the interfered station and interfering station must be exactly the same in order to detect the feature sequence and perform the interference circumvention, which greatly limits the application scenarios of this scheme.

In order to solve the shortcomings of the prior art, an embodiment of the present application provides a method for circumventing far-end interference based on reference signals in a wireless communication system, which includes.

First embodiment: the determination of far-end interference.

After detecting the suspected far-end interference based on the far-end interference features (including the ramp feature of time-domain interference intensity from high to low, the feature of higher interference intensity of some Physical Resource Blocks (PRBs) in the middle of the frequency domain), the interfered station sends a dedicated reference signal sequence to the interfering station; and after detecting the dedicated reference signal sequence, the interfering station determines that far-end interference has been detected based on the reciprocity of the far-end interference and sends a dedicated reference signal sequence to the interfered station, and the interfered station determines that there is far-end interference according to the detected dedicated reference signal sequence.

After detecting the far-end interference continuously based on the dedicated reference signal sequence, the interfered station or the interfering station automatically executes the far-end interference circumvention based on the detection result information. The specific implementation scheme of the far-end interference circumvention refers to the following embodiments.

Second embodiment: the interfered station or the interfering station adjusts the GP length according to the detection result of the reference signal sequence of this station to circumvent the far-end interference.

(1) If the interfered station or the interfering station continuously detects the reference signal sequence within the set time T1, it identifies the far-end interference source according to the detected reference signal sequence, and then adjusts the GP length according to the distance information of the detected far-end interference source, to circumvent the interference. Due to the reciprocity of far-end interference (which is the two-way degree of the far-end interference of the opposite end that can be mutually received between the base stations in a period of time, and can be quantitatively evaluated by using the reciprocity rate of far-end interference), the interfered station and the interfering station circumvent the mutual far-end interference by adjusting the GP length respectively.

For the acquisition of the distance information of the far-end interference source, it can be obtained according to the statistical distribution information of distances of all far-end interference sources detected in the detection window, or the distance of the far-end interference source is determined according to the last symbol of the reference signal sequence detected in the detection window (that is, the detected maximum distance of the interference source). In one embodiment, the distance of the far-end interference source is determined according to the statistical distribution information of distances of all the detected far-end interference sources. The statistical distribution information of distances of the far-end interference sources may be Cumulative Distribution Function (CDF) or other forms of statistical information. For example, for the CDF, the distance of the far-end interference source with a probability of 80% can be selected as the distance of the far-end interference source with the determined GP length. The specific selection probability can be set according to the specific situation.

In the 5G NR, when the base station adjusts the GP length by adjusting the time slot format configuration, the time slot format must be the time slot format specified by the 3GPP protocol. According to the relevant content of the protocol, the GP length is specified as the number of "F" symbols (i.e., Flexible symbols which are symbols that are not designated for uplink or downlink and can be used for uplink, downlink or GP as required) in the time slot format, and the GP length needs to meet the distance requirement of the far-end interference source obtained by detection and statistics, that is, the number of GP symbols is converted into duration, and the wireless propagation distance obtained by multiplying the duration by the speed of light must be greater than or equal to the distance of the far-end interference source obtained by the above method through statistics. If all 14 symbols of an S time slot (i.e., special time slot) are rolled back and used as the GP but cannot meet the distance requirement of the detected far-end interference source, it is necessary to further roll back 14 symbols of a D time slot (downlink time slot) immediately before the S time slot partially or completely, and no data is sent on the rolled-back symbols.

(2) If the base station cannot continuously detect the reference signal sequence within the set time T2 and no suspected far-end interference is detected based on the far-end interference features, the GP length of this station is restored, that is, the format configuration of the current S time slot is adjusted to the original time slot format configuration.

Third embodiment: the interfered station or the interfering station adjusts the GP length by reporting the detection result information of the far-end interference to the centralized control device or OAM.

(1) If the interfered station or the interfering station continuously detects the reference signal sequence within the set time T1, it reports the detection result information of the far-end interference to the centralized control device or Operation Administration and Maintenance (OAM) entity, and the centralized control device or OAM decides whether to instruct the interfered station or the interfering station to adjust the GP length and adjust to which time slot format configuration according to the detection result information of the far-end interference of the interfered station or the interfering station as well as the distance statistics information of the far-end interference source. How to adjust the GP length is consistent with the first embodiment, and the interfered station and the interfering station circumvent the far-end interference by adjusting the GP length respectively.

(2) If the base station cannot continuously detect the reference signal sequence within the set time T2 and no suspected far-end interference is detected based on the far-end interference features, the base station reports the detection result information of the far-end interference to the centralized control device or OAM, and the centralized control device or OAM decides whether to instruct the interfered station or the interfering station to adjust the GP length and adjust to which time slot format configuration according to the detection result information of the far-end interference of the interfered station or the interfering station. How to adjust the GP length is exactly the same as the first embodiment, and the interfered station and the interfering station circumvent the far-end interference by adjusting the GP length respectively. Through the method provided by the above embodiments of the present application, the base station can adjust the GP length flexibly, and can not only roll back symbols but also roll back the entire downlink time slot, which can basically circumvent all far-end interferences with possible distances; the base station adjusts the GP length flexibly and dynamically according to the distance information of the detected far-end interference source, and to sufficiently reduce the loss of the downlink throughput caused by the rolled-back symbols due to interference circumvention; and furthermore, the present application does not require the identification of far-end interference sources, and the interference circumvention will be performed as long as the far-end interference is continuously detected. Therefore, the interference detection and interference circumvention of the method provided by the present application has the better timeliness.

Figure 1:
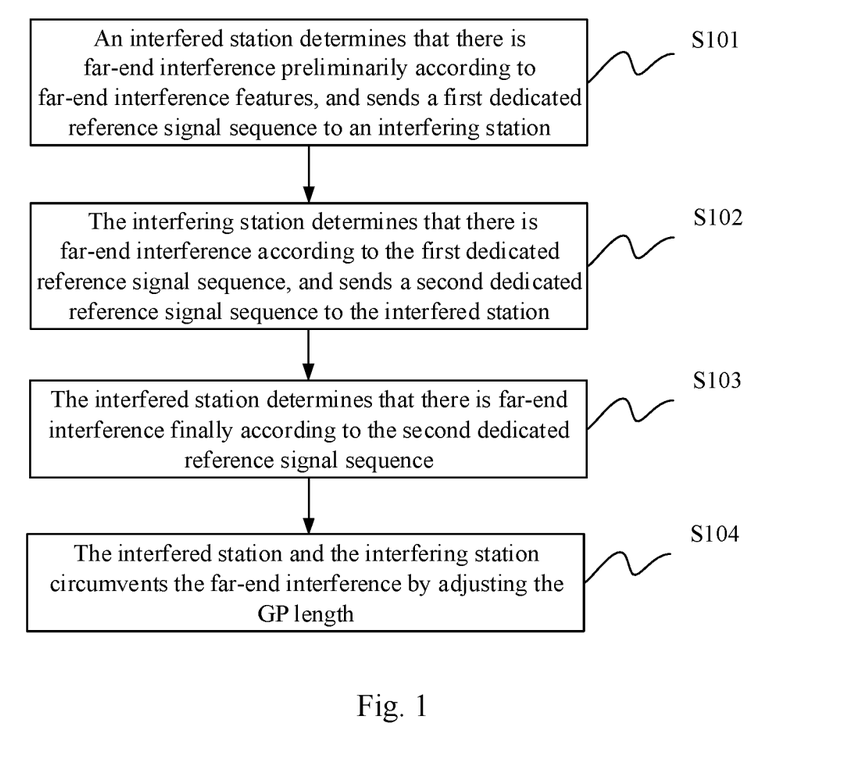
FIG. 1 is a schematic flowchart of a method for circumventing far-end interference provided by an embodiment of the present application.

In summary, an embodiment of the present application provides a method for circumventing far-end interference, referring to FIG. 1, which includes:

S101: an interfered station determines that there is far-end interference preliminarily according to far-end interference features, and sends a first dedicated reference signal sequence to an interfering station;

S102: the interfering station determines that there is far-end interference according to the first dedicated reference signal sequence, and sends a second dedicated reference signal sequence to the interfered station;

S103: the interfered station determines that there is far-end interference finally according to the second dedicated reference signal sequence;

The specific implementation of the determination of the far-end interference can refer to the first embodiment;

S104: the interfered station and the interfering station circumvents the far-end interference by adjusting the GP length;

In one embodiment, there are two ways to adjust the GP length in the second embodiment and the third embodiment.

Figure 2:
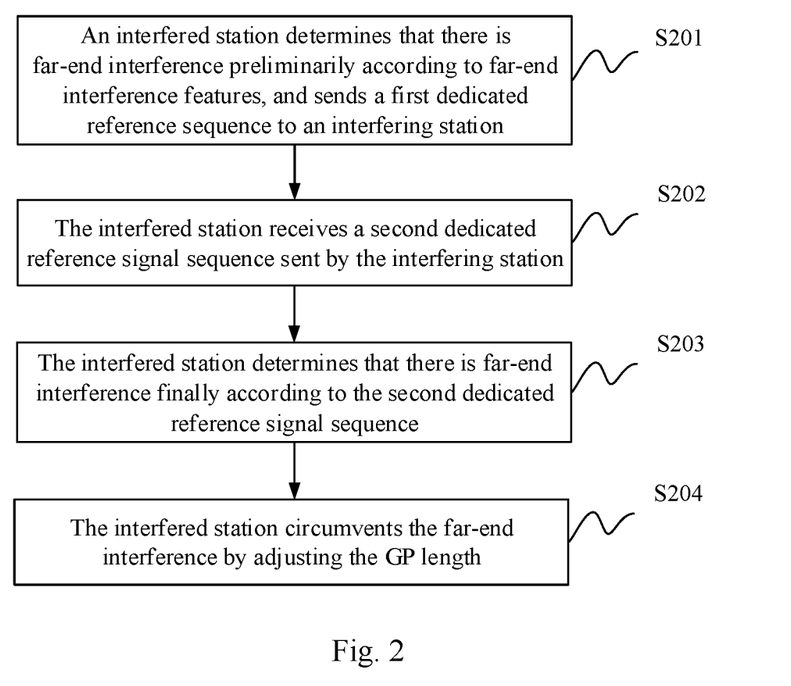
FIG. 2 is a schematic flowchart of a method for circumventing far-end interference provided at the interfered station side of an embodiment of the present application.

At the interfered station side, an embodiment of the present application provides a method for circumventing far-end interference, referring to FIG. 2, which includes:

S201: an interfered station determines that there is far-end interference preliminarily according to far-end interference features, and sends a first dedicated reference sequence to an interfering station;

S202: the interfered station receives a second dedicated reference signal sequence sent by the interfering station;

S203: the interfered station determines that there is far-end interference finally according to the second dedicated reference signal sequence;

S204: the interfered station circumvents the far-end interference by adjusting the GP length.

Figure 3:
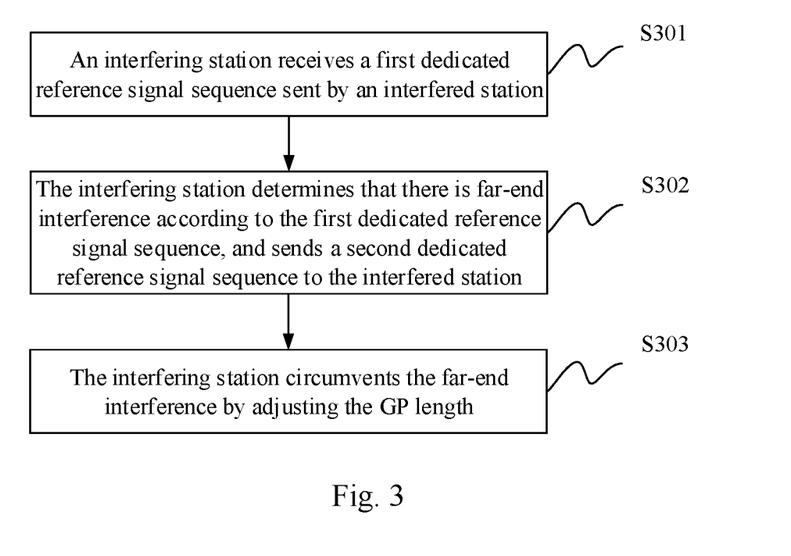
FIG. 3 is a schematic flowchart of a method for circumventing far-end interference provided at the interfering station side of an embodiment of the present application.

At the interfering station side, an embodiment of the present application provides a method for circumventing far-end interference, referring to FIG. 3, which includes:

S301: an interfering station receives a first dedicated reference signal sequence sent by an interfered station;

S302: the interfering station determines that there is far-end interference according to the first dedicated reference signal sequence, and sends a second dedicated reference signal sequence to the interfered station;

S303: the interfering station circumvents the far-end interference by adjusting the GP length.

Figure 4:
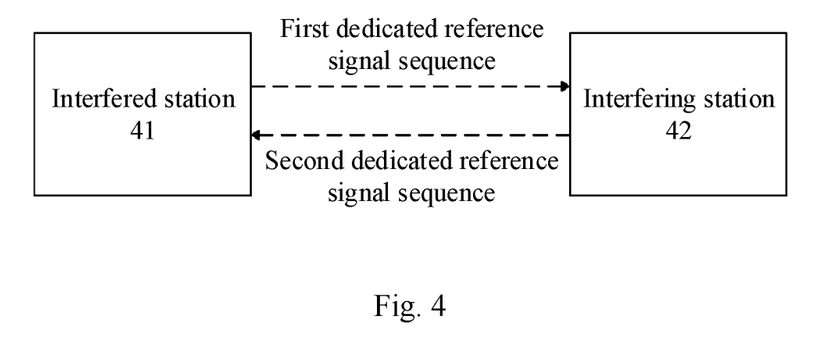
FIG. 4 is a structural schematic diagram of a system for circumventing far-end interference provided at the interfered station side of an embodiment of the present application.

An embodiment of the present application provides a system for circumventing far-end interference according to the foregoing methods for circumventing far-end interference, and referring to FIG. 4, the system includes: an interfered station 41 and an interfering station 42, and the interfered station determines that there is far-end interference preliminarily according to far-end interference features and sends a first dedicated reference signal sequence to the interfering station;

the interfering station determines that there is far-end interference according to the first dedicated reference signal sequence, and sends a second dedicated reference signal sequence to the interfered station;

the interfered station determines that there is far-end interference finally according to the second dedicated reference signal sequence;

the interfered station and the interfering station circumvent the far-end interference by adjusting the GP length.

Figure 5:
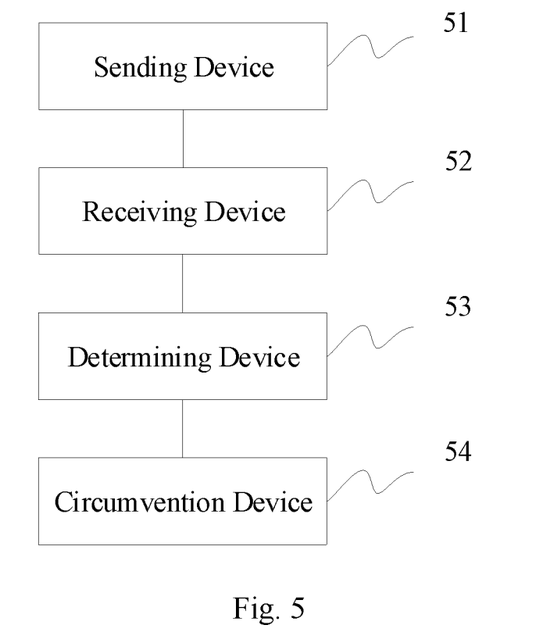
FIG. 5 is a structural schematic diagram of a device for circumventing far-end interference provided at the interfered station side of an embodiment of the present application.

Correspondingly, at the interfered station side, an embodiment of the present application provides a device for circumventing far-end interference, referring to FIG. 5, which includes:

a sending device 51 used by an interfered station to determine that there is far-end interference preliminarily according to far-end interference features, and send a first dedicated reference sequence to an interfering station;

a receiving device 52 used by the interfered station to receive a second dedicated reference signal sequence sent by the interfering station;

a determining device 53 used by the interfered station to determine that there is far-end interference finally according to the second dedicated reference signal sequence;

a circumvention device 54 used by the interfered station to circumvent the far-end interference by adjusting the GP length.

Figure 6:
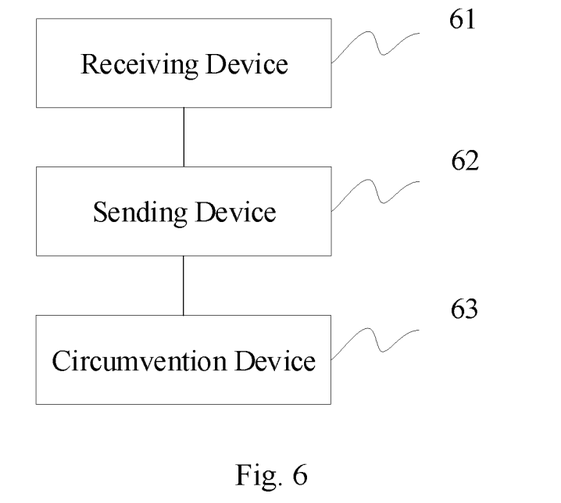
FIG. 6 is a structural schematic diagram of a device for circumventing far-end interference provided at the interfering station side of an embodiment of the present application.

At the interfering station side, an embodiment of the present application provides a device for circumventing far-end interference, referring to FIG. 6, which includes:

a receiving device 61 used by an interfering station to receive a first dedicated reference signal sequence sent by an interfered station;

a sending device 62 used by the interfering station to determine that there is far-end interference according to the first dedicated reference signal sequence, and send a second dedicated reference signal sequence to the interfered station;

a circumvention device 63 used by the interfering station to circumvent the far-end interference by adjusting the GP length.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, embodiments of the present application essentially or a part that contributes to the prior art or all or a part of the embodiments may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Device (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

Figure 7:
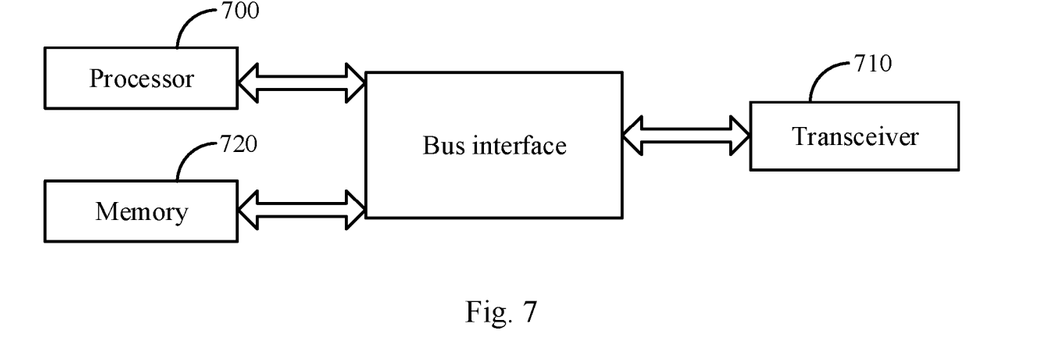
FIG. 7 is a structural schematic diagram of another device for circumventing far-end interference provided by an embodiment of the present application.

At the interfered station side, an embodiment of the present application provides an interference circumvention device, referring to FIG. 7, which includes:

a processor 700 configured to read the programs in a memory 720 to perform the following process:

an interfered station determines that there is far-end interference preliminarily according to far-end interference features, and sends a first dedicated reference sequence to an interfering station via a transceiver 710;

the interfered station receives a second dedicated reference signal sequence sent by the interfering station via the transceiver 710;

the interfered station determines that there is far-end interference finally according to the second dedicated reference signal sequence;

the interfered station circumvents the far-end interference by adjusting the GP length.

In one embodiment, the interfered station adjusts the GP length in one of the following ways:

adjusting the GP length by adjusting a time slot format configuration according to distance information of a detected far-end interference source when a reference signal sequence is continuously detected within first preset time; and the distance information of the far-end interference source is determined according to the detection result of the far-end interference source within the first preset time;

reporting the detection result information of the far-end interference to a centralized control device or an OAM; and the centralized control device or the OAM instructs the interfered station to adjust the GP length by adjusting the time slot format configuration according to the detection result information of the far-end interference and the distance information of the far-end interference source.

In one embodiment, the distance information of the far-end interference source is determined according to one of:

the statistical distribution information of distances of all far-end interference sources detected in a detection window;

the last symbol of the reference signal sequence detected in the detection window.

In one embodiment, after the interfered station adjusts the GP length by adjusting the time slot format configuration according to the distance information of the detected far-end interference source, if the reference signal sequence is not continuously detected within the second preset time, the GP length of the interfered station is restored.

At the interfering station side, the processor 700 performs the following process:

an interfering station receives a first dedicated reference signal sequence sent by an interfered station via the transceiver 710;

the interfering station determines that there is far-end interference according to the first dedicated reference signal sequence, and sends a second dedicated reference signal sequence to the interfered station via the transceiver 710;

the interfering station circumvents the far-end interference by adjusting the GP length.

In one embodiment, the interfering station adjusts the GP length in one of the following ways:

adjusting the GP length by adjusting a time slot format configuration according to distance information of a detected far-end interference source when a reference signal sequence is continuously detected within first preset time; and the distance information of the far-end interference source is determined according to the detection result of the far-end interference source within the first preset time;

reporting the detection result information of the far-end interference to a centralized control device or an OAM; and the centralized control device or the OAM instructs the interfering station to adjust the GP length by adjusting the time slot format configuration according to the detection result information of the far-end interference and the distance information of the far-end interference source.

In one embodiment, the distance information of the far-end interference source is determined according to one of:

the statistical distribution information of distances of all far-end interference sources detected in a detection window;

the last symbol of the reference signal sequence detected in the detection window.

In one embodiment, after the interfering station adjusts the GP length by adjusting the time slot format configuration according to the distance information of the detected far-end interference source, if the reference signal sequence is not continuously detected within the second preset time, the GP length of the interfering station is restored.

The transceiver 710 is configured to receive and send the data under the control of the processor 700.

Here, in FIG. 7, the bus architecture can include any numbers of interconnected buses and bridges, and specifically link various circuits of one or more processors represented by the processor 700 and the memory represented by the memory 720. The bus architecture may further link various other circuits such as peripheral device, voltage regulator and power management circuit, which are all well known in the art and thus will not be further described again herein. The bus interface provides an interface. The transceiver 710 can be multiple elements, i.e., include a transmitter and a receiver, and provide the devices for communicating with various other devices over the transmission media. The processor 700 is responsible for managing the bus architecture and general processing, and the memory 720 can store the data used by the processor 700 when performing the operations.

The processor 700 may be Central Processing Device (CPU), Application Specific Integrated Circuit (ASIC), Field-Programmable Gate Array (FPGA) or Complex Programmable Logic Device (CPLD).

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

In summary, the method for circumventing far-end interference provided by the present application can adjust the GP length flexibly and dynamically according to the distance information of the detected far-end interference source, and to sufficiently reduce the loss of the downlink throughput caused by the rolled-back symbols due to interference circumvention; and the present application does not require the identification of far-end interference sources, and the interference circumvention will be performed as long as the far-end interference is continuously detected. Therefore, the interference detection and interference circumvention of the far-end interference provided by the present application has the better timeliness.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for circumventing far-end interference, comprises:
   determining, by an interfered station, that there is far-end interference preliminarily according to far-end interference features, and sending a first dedicated reference signal sequence to an interfering station;
   determining, by the interfering station, that there is far-end interference according to the first dedicated reference signal sequence, and sending a second dedicated reference signal sequence to the interfered station;
   determining, by the interfered station, that there is far-end interference finally according to the second dedicated reference signal sequence;
   circumventing, by the interfered station and the interfering station, the far-end interference by adjusting a Guard Period, GP, length;
   wherein the interfered station and/or the interfering station adjust the GP length in one of following ways:
   adjusting the GP length by adjusting a time slot format configuration according to distance information of a detected far-end interference source when a reference signal sequence is continuously detected within first preset time; wherein the distance information of the far-end interference source is determined according to a detection result of the far-end interference source within the first preset time; and detection result information of the far-end interference comprises a base station ID of the far-end interference source and a distance of the far-end interference source; or
   reporting detection result information of the far-end interference to a centralized control unit or an OAM; wherein the centralized control unit or the OAM determines a base station which needs to adjust the GP length according to the detection result information of the far-end interference and instructs the base station to adjust the GP length by adjusting a time slot format configuration.

2. The method according to claim 1, wherein the distance information of the far-end interference source is determined according to one of:
  statistical distribution information of distances of all far-end interference sources detected in a detection window;
  a last symbol of the reference signal sequence detected in the detection window.

3. The method according to claim 1, wherein after the interfered station or the interfering station adjusts the GP length by adjusting the time slot format configuration according to the distance information of the detected far-end interference source, if the reference signal sequence is not continuously detected within second preset time, the GP length of the interfered station or the interfering station is restored.

4. The method according to claim 3, wherein the distance information of the far-end interference source is determined according to one of:
  statistical distribution information of distances of all far-end interference sources detected in a detection window;
  a last symbol of the reference signal sequence detected in the detection window.

5. The method according to claim 1, wherein after the interfered station or the interfering station adjusts the GP length by adjusting the time slot format configuration according to indication information of the centralized control unit or the OAM, if the reference signal sequence is not continuously detected within second preset time, reporting, by the interfered station or the interfering station, the detection result information of the far-end interference to the centralized control unit or the OAM; and instructing, by the centralized control unit or the OAM, the interfered station or the interfering station to adjust the GP length by adjusting the time slot format configuration according to the detection result information of the far-end interference.

6. A system for circumventing far-end interference, comprises: an interfered station and an interfering station, wherein the system for circumventing far-end interference is configured to perform the method according to claim 1.

7. A non transitory computer storage medium, wherein the non transitory computer storage medium stores computer executable instructions which are configured to cause the computer to perform the method of claim 1.

8. A device for circumventing far-end interference, comprises:
  a memory configured to store program instructions;
  a processor configured to invoke the program instructions stored in the memory to perform following steps:
  determining that there is far-end interference preliminarily according to far-end interference features, and sending a first dedicated reference sequence to an interfering station;
  receiving a second dedicated reference signal sequence sent by the interfering station;
  determining that there is far-end interference finally according to the second dedicated reference signal sequence;
  circumventing the far-end interference by adjusting a GP length;
  wherein the processor is further configured to adjust the GP length in one of following ways:
  adjusting the GP length by adjusting a time slot format configuration according to distance information of a detected far-end interference source when a reference signal sequence is continuously detected within first preset time; wherein the distance information of the far-end interference source is determined according to a detection result of the far-end interference source within the first preset time; or
  reporting detection result information of the far-end interference to a centralized control unit or an OAM; wherein the centralized control unit or the OAM instructs the interfered station to adjust the GP length by adjusting the time slot format configuration according to the detection result information of the far-end interference and the distance information of the far-end interference source.

9. The circumvention device according to claim 8, wherein the processor is further configured to determine the distance information of the far-end interference source according to one of:
  statistical distribution information of distances of all far-end interference sources detected in a detection window;
  a last symbol of the reference signal sequence detected in the detection window.

10. The circumvention device according to claim 8, wherein the processor is further configured to:
  restore the GP length of the circumvention device if the reference signal sequence is not continuously detected within second preset time after adjusting the GP length by adjusting the time slot format configuration according to the distance information of the detected far-end interference source.

11. A device for circumventing far-end interference, comprises:
  a memory configured to store program instructions;
  a processor configured to invoke the program instructions stored in the memory to perform following steps:
  receiving a first dedicated reference signal sequence sent by an interfered station;
  determining that there is far-end interference according to the first dedicated reference signal sequence, and sending a second dedicated reference signal sequence to the interfered station;
  circumventing the far-end interference by adjusting a GP length;
  wherein the processor is further configured to adjust the GP length in one of following ways:
  adjusting the GP length by adjusting a time slot format configuration according to distance information of a detected far-end interference source when a reference signal sequence is continuously detected within first preset time; wherein the distance information of the far-end interference source is determined according to a detection result of the far-end interference source within the first preset time; or
  reporting detection result information of the far-end interference to a centralized control unit or an OAM; wherein the centralized control unit or the OAM instructs the interfering station to adjust the GP length by adjusting the time slot format configuration according to the detection result information of the far-end interference and the distance information of the far-end interference source.

12. The circumvention device according to claim 11, wherein the processor is further configured to determine the distance information of the far-end interference source according to one of:
- statistical distribution information of distances of all far-end interference sources detected in a detection window;
- a last symbol of the reference signal sequence detected in the detection window.

13. The circumvention device according to claim 11, wherein the processor is further configured to:
- restore the GP length of the circumvention device if the reference signal sequence is not continuously detected within second preset time after adjusting the GP length by adjusting the time slot format configuration according to the distance information of the detected far-end interference source.

* * * * *